(12) United States Patent
Mais (10) Patent No.: US 11,167,188 B1
(45) Date of Patent: Nov. 9, 2021

(54) GOLF BAG CART ATTACHMENT

(71) Applicant: Jamie Mais, Weston, CT (US)

(72) Inventor: Jamie Mais, Weston, CT (US)

( * ) Notice: Subject to any disclaimer, the term of this patent is extended or adjusted under 35 U.S.C. 154(b) by 368 days.

(21) Appl. No.: 16/229,152

(22) Filed: Dec. 21, 2018

Related U.S. Application Data (60) Provisional application No. 62/609,648, filed on Dec. 22, 2017.

(51) Int. Cl.
*A63B 55/40* (2015.01)

(52) U.S. Cl.
CPC .................... *A63B 55/40* (2015.10)

(58) Field of Classification Search
CPC ................ A63B 55/00; A63B 55/40
See application file for complete search history.

(56) References Cited

U.S. PATENT DOCUMENTS

| | | | | |
|---|---|---|---|---|
| 1,770,060 A * | 7/1930 | Barlow | ................... | A63B 55/40 206/315.6 |
| 1,920,308 A * | 8/1933 | Hiles | ...................... | A63B 55/40 206/315.6 |
| 1,932,934 A * | 10/1933 | Heumann | ................. | B60R 9/02 224/42.32 |
| 2,823,971 A * | 2/1958 | Hoyt | ....................... | A01K 97/06 312/290 |
| 2,937,680 A * | 5/1960 | Dumas | ................... | A45C 15/06 150/116 |
| 3,043,602 A * | 7/1962 | Meiklejohn | ............. | B62B 1/045 280/38 |
| 3,652,174 A * | 3/1972 | Boone | ..................... | B65D 83/20 401/143 |
| 3,980,115 A * | 9/1976 | Longo | .................... | A63B 55/00 206/315.6 |
| 4,111,248 A * | 9/1978 | Leichhardt | ............. | A63B 55/40 206/315.6 |
| 4,153,264 A * | 5/1979 | Pfister | ....................... | B62B 1/04 280/38 |
| 4,673,082 A | 6/1987 | Hemme | | |
| 4,709,814 A * | 12/1987 | Antonious | ............. | A63B 55/00 206/315.3 |
| 4,753,344 A | 6/1988 | Antonious | | |
| 4,753,446 A * | 6/1988 | Mills | ...................... | A63B 55/00 280/47.18 |
| 4,915,221 A * | 4/1990 | Spangler | ................ | A63B 55/40 206/315.6 |
| 5,361,899 A * | 11/1994 | Reimers | ................. | A63B 55/00 206/315.6 |
| 5,366,075 A * | 11/1994 | Mills | ...................... | A63B 55/00 206/315.6 |

(Continued)

FOREIGN PATENT DOCUMENTS

WO    WO-2005009549 A1 *   2/2005   ............. A63B 55/10

*Primary Examiner* — James N Smalley
*Assistant Examiner* — Justin Caudill
(74) *Attorney, Agent, or Firm* — Cramer Patent & Design, PLLC; Aaron R. Cramer (57) ABSTRACT

A golf bag cart attachment includes the golf bag having a durable waterproof exterior shell, a cylindrical and removable internal rotating golf club holder, a plurality of spring-hinged pockets disposed upon the exterior of the bag, a durable shell locking cover, a side-mounted holder suitable of supporting an umbrella or a putter, and a reusable attachment device which permits a user to temporally secure the golf bag to a golf cart.

8 Claims, 5 Drawing Sheets

(56) References Cited

U.S. PATENT DOCUMENTS

| | | | | |
|---|---|---|---|---|
| 5,431,278 A * | 7/1995 | Gretz | A63B 55/00 | 206/315.6 |
| 5,431,364 A * | 7/1995 | Etter | A45B 11/00 | 135/16 |
| 5,474,191 A * | 12/1995 | Bergeron | A63B 55/00 | 211/70.2 |
| 5,505,300 A * | 4/1996 | Joh | A63B 55/40 | 206/315.6 |
| 5,613,603 A | 3/1997 | Joh | | |
| 5,671,842 A * | 9/1997 | Jaworski | A63B 55/00 | 206/315.3 |
| 6,202,840 B1 * | 3/2001 | Chang | A63B 55/00 | 206/315.4 |
| 6,237,197 B1 * | 5/2001 | Donahue | A44B 11/005 | 24/166 |
| 6,409,188 B1 * | 6/2002 | Hesmer | B60D 1/00 | 280/79.5 |
| 7,481,311 B1 | 1/2009 | Old | | |
| 7,832,557 B2 * | 11/2010 | Amin | A63B 55/408 | 206/315.5 |
| 8,640,866 B1 * | 2/2014 | Dow | A63B 55/20 | 206/315.2 |
| 9,833,671 B1 * | 12/2017 | Bryant | A63B 55/40 | |
| 10,004,961 B2 * | 6/2018 | Pittman | B65G 65/00 | |
| 2002/0017803 A1 * | 2/2002 | Dolan | B60J 7/10 | 296/100.18 |
| 2002/0063071 A1 | 5/2002 | Laffy | | |
| 2002/0144917 A1 * | 10/2002 | Barrise | A63B 55/00 | 206/315.3 |
| 2003/0106817 A1 * | 6/2003 | Buckley | A63B 55/40 | 206/315.6 |
| 2003/0197104 A1 * | 10/2003 | Heybl | B60N 3/108 | 248/311.2 |
| 2004/0163913 A1 * | 8/2004 | Tschudy | A45C 5/06 | 190/111 |
| 2004/0238387 A1 | 12/2004 | Heidenreich | | |
| 2005/0000987 A1 * | 1/2005 | Heidenreich | A63B 55/00 | 206/315.6 |
| 2005/0079923 A1 * | 4/2005 | Droppleman | F16B 21/04 | 473/287 |
| 2008/0064522 A1 * | 3/2008 | Watkins | A63B 53/00 | 473/288 |
| 2008/0169211 A1 * | 7/2008 | Franz | A63B 55/40 | 206/315.6 |
| 2009/0033050 A1 * | 2/2009 | Ting | A63B 55/60 | 280/47.26 |
| 2009/0092343 A1 * | 4/2009 | Thomson | A45C 13/103 | 383/64 |
| 2010/0320106 A1 * | 12/2010 | McGuire | A63B 55/57 | 206/315.7 |
| 2011/0073504 A1 | 3/2011 | Aubrey | | |
| 2012/0223112 A1 * | 9/2012 | Campbell | B60R 9/08 | 224/274 |
| 2012/0325699 A1 * | 12/2012 | Herron | A63B 55/60 | 206/315.5 |
| 2013/0048456 A1 * | 2/2013 | Govor | A45C 13/02 | 190/111 |
| 2013/0105341 A1 * | 5/2013 | Whitworth | A63B 55/408 | 206/315.6 |
| 2014/0040064 A1 * | 2/2014 | Anderson | G06Q 30/0621 | 705/26.5 |
| 2014/0332421 A1 * | 11/2014 | Jones | A63B 55/40 | 206/315.6 |
| 2016/0303442 A1 * | 10/2016 | Tran | B60K 28/06 | |
| 2017/0280868 A1 * | 10/2017 | Campbell, Jr. | A47B 9/20 | |
| 2017/0296890 A1 * | 10/2017 | Maguire | A63B 55/30 | |
| 2019/0143192 A1 * | 5/2019 | Dittemore | A63B 71/0036 | 206/315.6 |
| 2020/0035047 A1 * | 1/2020 | Arnold | G07C 9/00174 | |
| 2020/0232175 A1 * | 7/2020 | Mitchell | E01H 1/1206 | |
| 2021/0016717 A1 * | 1/2021 | Bonenberger | A63B 55/60 | |

\* cited by examiner

GOLF BAG CART ATTACHMENT

RELATED APPLICATION

The present invention claims the benefit of U.S. provisional application Ser. No. 62/609,648, filed Dec. 22, 2017, the entire disclosures of which are incorporated herein by reference.

FIELD OF THE INVENTION

The present invention relates generally to the field of a golf bag cart attachment.

BACKGROUND OF THE INVENTION

Golf is a sport that is played for both purposes of entertainment and, in some cases, exercise. Moving about a given golf course gives a player an opportunity to both engage in a game of skill and ambulate in a manner that is beneficial to the health of a player.

While exercise may be an ancillary benefit of playing golf, it is not always a practical or necessary aspect of playing the game. In fact, oftentimes a given player may not require exercise or have the time to engage in the same. In these instances, a golf cart is often utilized which expedites the journey one would normally take to play a round or two (2) of golf.

However; in fairness, it is not merely a consideration of time that factors into utilizing a golf cart as the implements required to play golf are somewhat heavy and burdensome. Therefore, the reality is that even a fit player may not desire to lug a golf bag laden with clubs and balls about a golf course when an easier and more enjoyable solution presents.

While it would seem an easy solution to simply load the golf bag into a golf cart and thereafter follow the game, the traditional means by which a golf bag, and its stowed components, is secured into the cart have questionable stability and physical security.

Accordingly, there exists a need for a means by which a golf clubs and accessories may be permanently stored upon a golf cart without present day disadvantages associated with conventional golf club bags and carts. Various attempts have been made to solve problems found in conventional golf club bags. Among these are found in: U.S. Pat. No. 4,753,344 A to Antonious; U.S. Pat. No. 4,673,082 A to Hemme; and U.S. Pat. No. 5,613,603 to Joh. These prior art references are representative of golf club bags.

None of the above inventions and patents, taken either singly or in combination, is seen to describe the invention as claimed. Thus, the golf bag of the instant application fulfills this need and to avoid the above-mentioned problems.

SUMMARY OF THE INVENTION

The principles of the present invention provide for a golf bag, comprising a central bag assembly defining a central bag assembly interior. The central bag assembly interior is accessed by a central bag assembly upper opening. At a second end of the central bag assembly is a golf club detachable base which defines a bottom and an interior into which a club cylinder assembly support having a protruding club cylinder assembly support axle is removably nested. The club cylinder assembly is removably and rotationally secured within the central bag assembly interior. The club cylinder assembly is made of a plurality of club dividers. The bag also provides for a cylinder axle running vertically through a center of the club dividers. The cylinder axle permits the club dividers to freely rotate in a first direction or an opposite second direction about the cylinder axle. The cylinder assembly is capped by an upper club organizer at a first end and the club cylinder assembly support at the second end. A plurality of pockets which are disposed on the exterior of the bag assembly may also be provided. Each of the pockets have a lock, a spring pocket hinge and a pocket handle. An interior of the club cylinder assembly support includes a plurality of receiving cups into which the base of a given golf club is secured.

The bag also comprises a support sleeve which is disposed vertically along a first exterior side of the central bag assembly and a strap channel which is disposed above a first pocket. The strap channel provides a space through which a strap may be secured within. The strap is employed to secure the golf bag to a golf cart.

A golf club bag lid is also disclosed and has a golf club bag lid lock. The golf club bag lid is secured about the central bag assembly upper opening. A clamp bracket assembly including a clamp bracket having an aperture through which a bolt having a pressure plate at a first end and a bolt handle at a second end is secured thereto is also provided. The clamp bracket assembly may secure the golf bag to a restraining bar of the golf cart. The clamp bracket engages the restraining bar with the threaded bolt, the pressure plate, and the bolt handle to restrain the golf club bag in place.

The golf club detachable base may be affixed to a golf cart surface by a plurality of fasteners which are selected from the group consisting of a plurality of bolts, a plurality of screws, or a plurality of rivets. The upper club organizer and the club cylinder assembly support may be capped by a rubberized liner. The club dividers are removably secured to the upper club organizer and the club cylinder assembly support by a plurality of mating hook-and-loop fasteners. A golf club shaft may be contained within the club divider, while a golf club head protrudes through the liner and is protected within the golf club bag lid. The cylinder axle may be secured about the club cylinder assembly support axle by means of a friction fit. The club dividers may be made of nylon while the club cylinder assembly may be freely rotated within the golf bag. The lock may comprise a combination lock, a keyed lock or a biometric lock. The support sleeve may be configured to support an umbrella and/or a putter. The golf club bag lid may be made of a durable water-proof material. The aperture and bolt are threaded.

An alternate golf cart attachment member may comprise a cruciform shape having at least one fastener aperture disposed at a distal end of each arm of the alternate golf cart attachment member. The alternate golf cart attachment member permits a user to secure a bottom of the golf bag to a planar surface associated with the golf cart by a fastener secured through each fastener aperture and around a surface of the golf cart. The alternate golf cart attachment member may permit a user to secure a tray of the golf bag to the planar surface associated with the golf cart by the fastener secured through each fastener aperture and around a surface of the golf cart.

The clamp bracket may be forward placed, side placed or at any position in between dependent on a specific configuration of the restraining bar. The golf bag may be made of a durable water-proof material.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 golf club bag
20 central bag assembly
21 central bag assembly upper opening
22 support sleeve
23 strap channel
24 pocket lock
25 first pocket
26 second pocket
27 third pocket
28 central bag assembly interior
29 spring pocket hinge
30 club cylinder assembly
35 upper club organizer
40 cylinder axle
41 pocket handle
45 club divider
50 golf club detachable base
60 club cylinder assembly support
62 receiving cup
63 tension spring clip
65 club cylinder assembly support axle
75 liner
80 golf club bag lid
85 golf club bag lid lock
89 clamp bracket assembly
90 clamp bracket
91 bolt
92 pressure plate
93 bolt handle
100 alternate attachment base
110 alternate attachment base aperture
115 golf cart
120 restraining bar
125 golf cart surface
130 fastener
135 hook-and-loop fastener
140 golf club shaft
145 golf club head

1. DESCRIPTION OF THE INVENTION

The present invention is directed to a golf bag 10. In one (1) embodiment of the present invention, the golf bag 10 is capable of permanent securement to a golf cart 115 and is preferably constructed of a durable water-proof material having a club cylinder assembly 30 rotationally secured within the central bag assembly 20.

Figure 1:
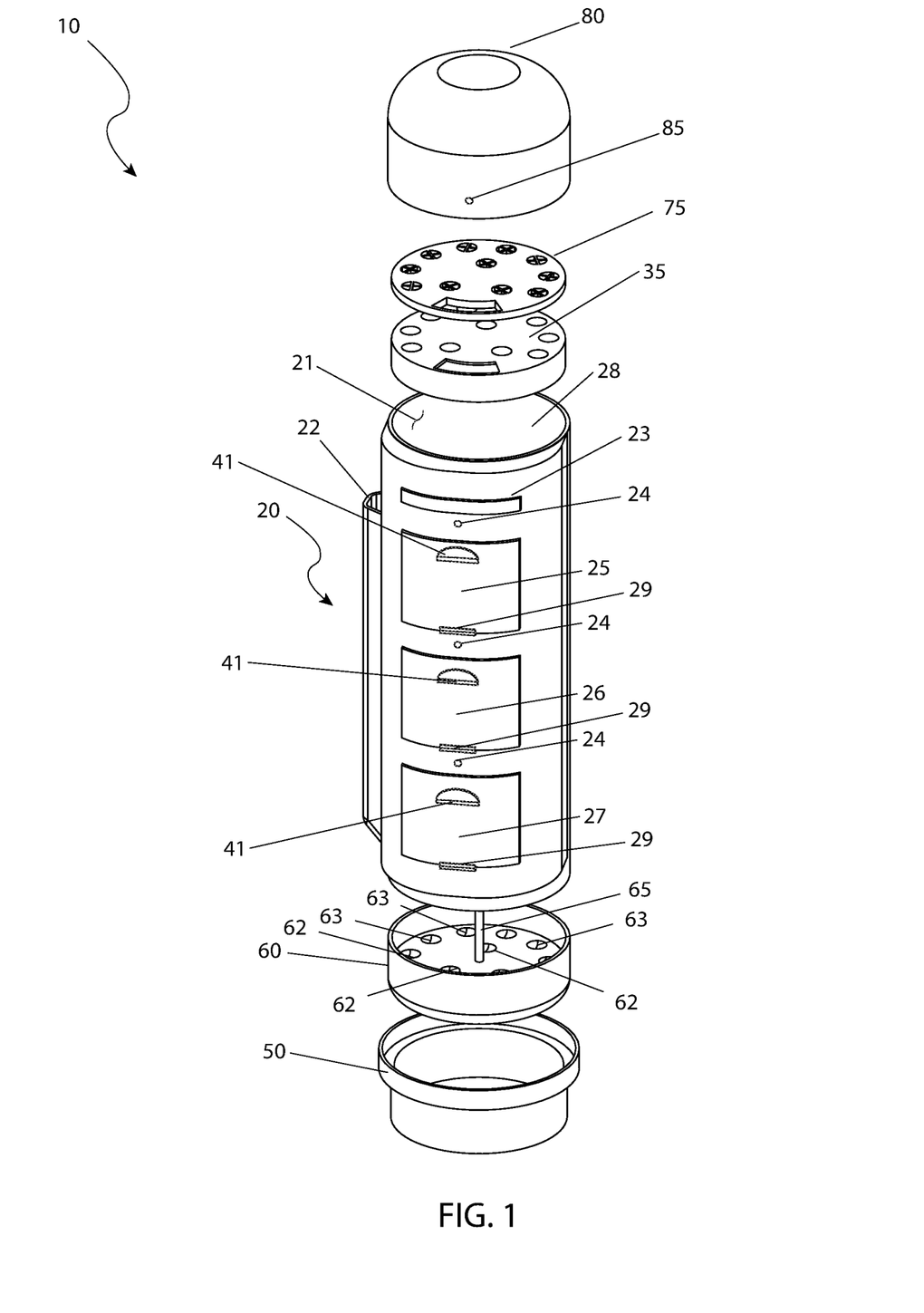
FIG. 1 is a perspective view of the golf club bag 10, according to an embodiment of the present invention.

Referring now to the drawing, there is shown in FIG. 1 a golf bag 10 comprising a central bag assembly 20 defining a central bag assembly interior 28 accessed by a central bag assembly upper opening 21. Disposed on the exterior of the bag assembly 20 are a plurality of pockets 25, 26, 27. Each pocket is outfitted with a lock 24, a spring pocket hinge 29 and a pocket handle 41. It is envisioned each lock 24 may be a combination, keyed and/or biometric lock. Disposed vertically along one (1) exterior side of the central bag assembly 20 is a support sleeve 22. While only one (1) support sleeve 22 is shown, it is envisioned that a separate embodiment of the golf bag 10 could have more than one (1) support sleeve 22 or none. The support sleeve 22 is particularly suited and configured to support an umbrella or putter.

Figure 2:
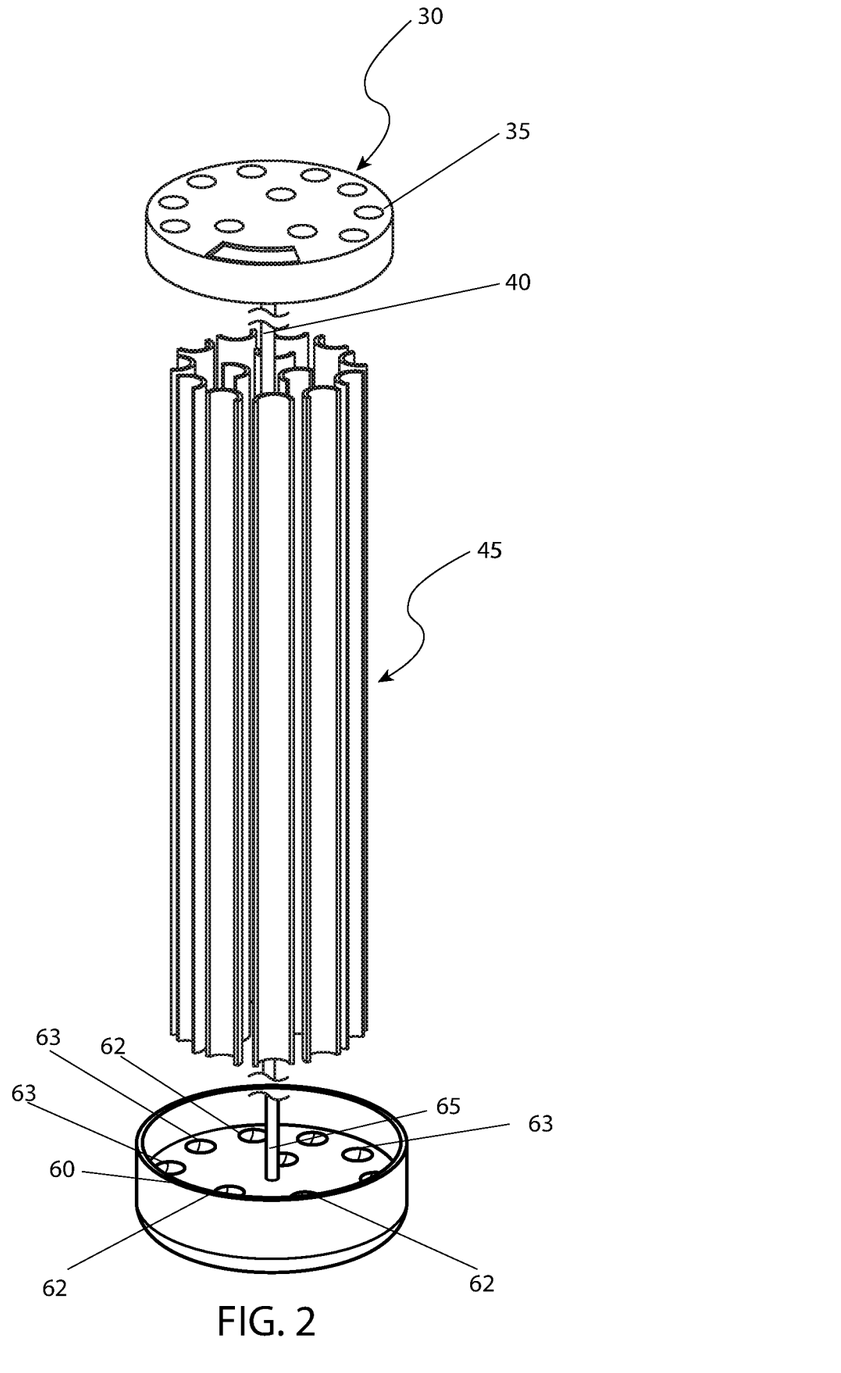
FIG. 2 is a perspective view of a club retention assembly 30, according to an embodiment of the present invention.

A strap channel 23 is disposed above a first pocket 25. The strap channel 23 provides a space through which a strap may be secured within. In the instant configuration, it is envisioned the strap may be employed to secure the golf bag 10 to a golf cart 115. At a second end of the central bag assembly 20 is a golf club detachable base 50 defining a bottom and interior into which a club cylinder assembly support 60 having a protruding club cylinder assembly support axle 65 that may be removably nested. It is envisioned that the interior environment of the club cylinder assembly support 60 will comprise a plurality of receiving cups 62 into which the base of a given golf club may be secured. Additionally, each receiving cup 62 is provided with a tension spring clip 63 which exerts adequate pressure against each golf club shaft 140 (not shown in this FIGURE) regardless of size (diameter) that prohibits the golf club from rotating. It is also envisioned that the cylinder axle 40 (as shown in FIG. 2) may be secured about the club cylinder assembly support axle 65 by means of a friction fit. Once so assembled, club cylinder assembly 30 may be freely rotated within the golf bag 10.

A golf club bag lid 80 is also disclosed having a golf club bag lid lock 85. The golf club bag lid 80 is intended to be secured about the central bag assembly upper opening 21. The golf club bag lid 80 is intended to be made of a durable water-proof material; however, the golf club bag lid 80 should not be considered as being limited to this material and may therefore by constructed of any material or fabric known in the art that is suited for the purpose and function of the golf club bag lid 80.

Referring now to FIG. 2, a club cylinder assembly 30 is removably and rotationally secured within the central bag assembly interior 28. The club cylinder assembly 30 is envisioned to be made of a plurality of club dividers 45, preferably fabricated out of nylon or another similar synthetic polymer. Running vertically through a center of the plurality of club dividers 45 is a cylinder axle 40. The cylinder axle 40 permits the plurality of club dividers 45 to freely rotate in a first direction or an opposite second direction about the cylinder axle 40. The club cylinder assembly 30 is capped by an upper club organizer 35 at a first end and the club cylinder assembly support 60 at a second end. It is envisioned that the upper club organizer 35 and the club cylinder assembly support 60 may be removed and replaced with alternate configurations or capped by a liner 75, which is preferably rubberized. However, having so depicted the alternate club organizers 75, it should in no way be considered as a limitation of the possible configurations of alternate club organizers 75 as the same are merely illustrated in FIG. 1 in the manner displayed for suggestive purposes. The plurality of club dividers 45 are removably secured to the upper club organizer 35 and the club cylinder assembly support 60 by a plurality of mating hook-and-loop fasteners 135 (more clearly shown in FIG. 6). This configuration permits the plurality of club dividers 45 to be organized in almost any manner a user may desire.

Figure 3:
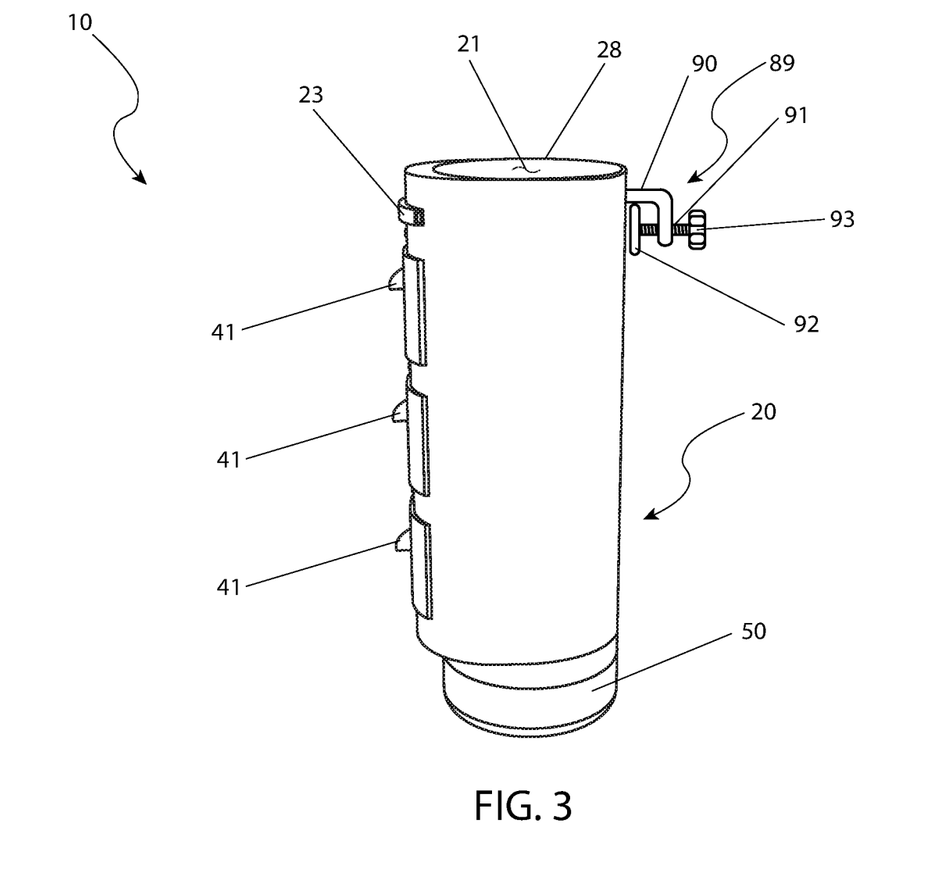
FIG. 3 is a perspective view of a central bag assembly 20 of the golf club bag 10, displaying a clamp bracket assembly 89, according to an embodiment of the present invention.

Referring now to FIG. 3, a perspective view of a central bag assembly 20 of the golf club bag 10, displaying a clamp bracket assembly 89, according to an embodiment of the present invention is disclosed. In addition to the features previously disclosed above, the clamp bracket assembly 89 comprises a clamp bracket 90 having an aperture through which a bolt 91, having a pressure plate 92 at a first end and a bolt handle 93 at a second end, can be secured thereto. In a preferred embodiment, the aperture and bolt 91 are threaded. The clamp bracket assembly 89 provides for a means to detachably secure the device 10 to a given restraining bar 120 of the golf cart 115.

Figure 4:
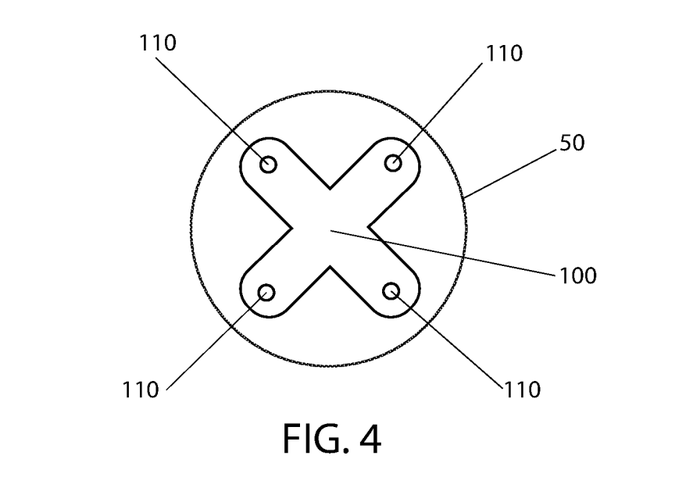
FIG. 4 is a bottom plan view of an alternate golf cart attachment member 100, according to an embodiment of the present invention.

Referring next to FIG. 4 is a bottom plan view of an alternate golf cart attachment member 100, according to an embodiment of the present invention. The alternate golf cart attachment member 100 has a cruciform shape having at least one (1) fastener aperture 110 disposed at the distal end of each arm of the alternate golf cart attachment member 100. The alternate golf cart attachment member 100 permits a user to secure the bottom 50 of the device 10 to a planar surface 125 or tray associated with the golf cart 115 by means of a fastener 130 secured through each fastener aperture 110 and around the surface 125 of the golf cart 115.

Figure 5:
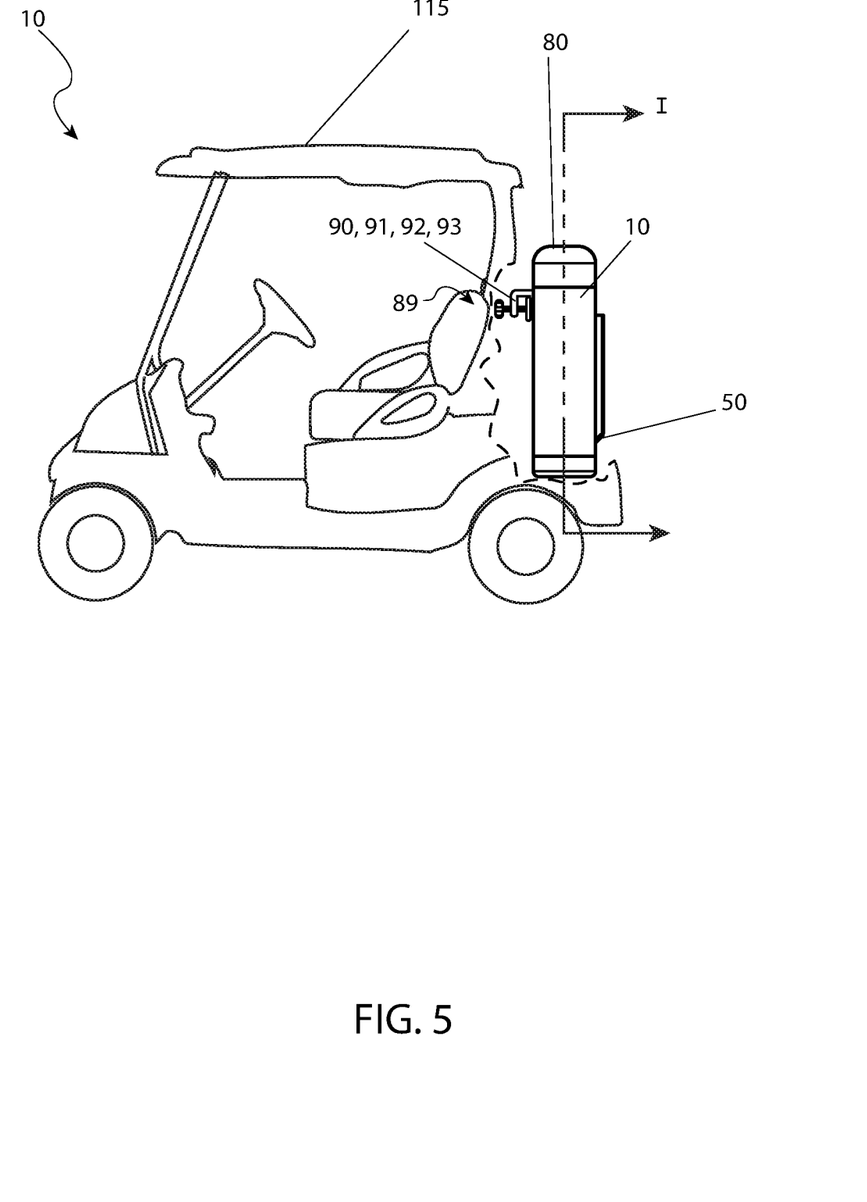
FIG. 5 is a side view of the golf club bag 10, shown in an installed state on a golf cart 115, according to an embodiment of the present invention; and, FIG. 6 is a sectional view of the golf club bag 10, as seen a line I-I, as shown in FIG. 5, according to an embodiment of the present invention.

Referring now to FIG. 5, a side view of the golf club bag 10, shown in an installed state on a golf cart 115, according to an embodiment of the present invention is depicted. The golf club bag 10 is shown in rearward location as a single unit. However, it is understood by those skilled in the art that multiple golf club bags 10 can be used with single golf cart 115. The golf cart 115 would be provided with a restraining bar 120 as part of its original or optional equipment. The clamp bracket 90 engages the restraining bar 120, with the threaded bolt 91, the pressure plate 92, and the bolt handle 93 tightened to restrain the golf club bag 10 in place during transit. Additionally, the golf club detachable base 50 is shown in an affixed position to a golf cart surface 125, such as floor, frame, body panel, shelf, or the like.

Figure 6:
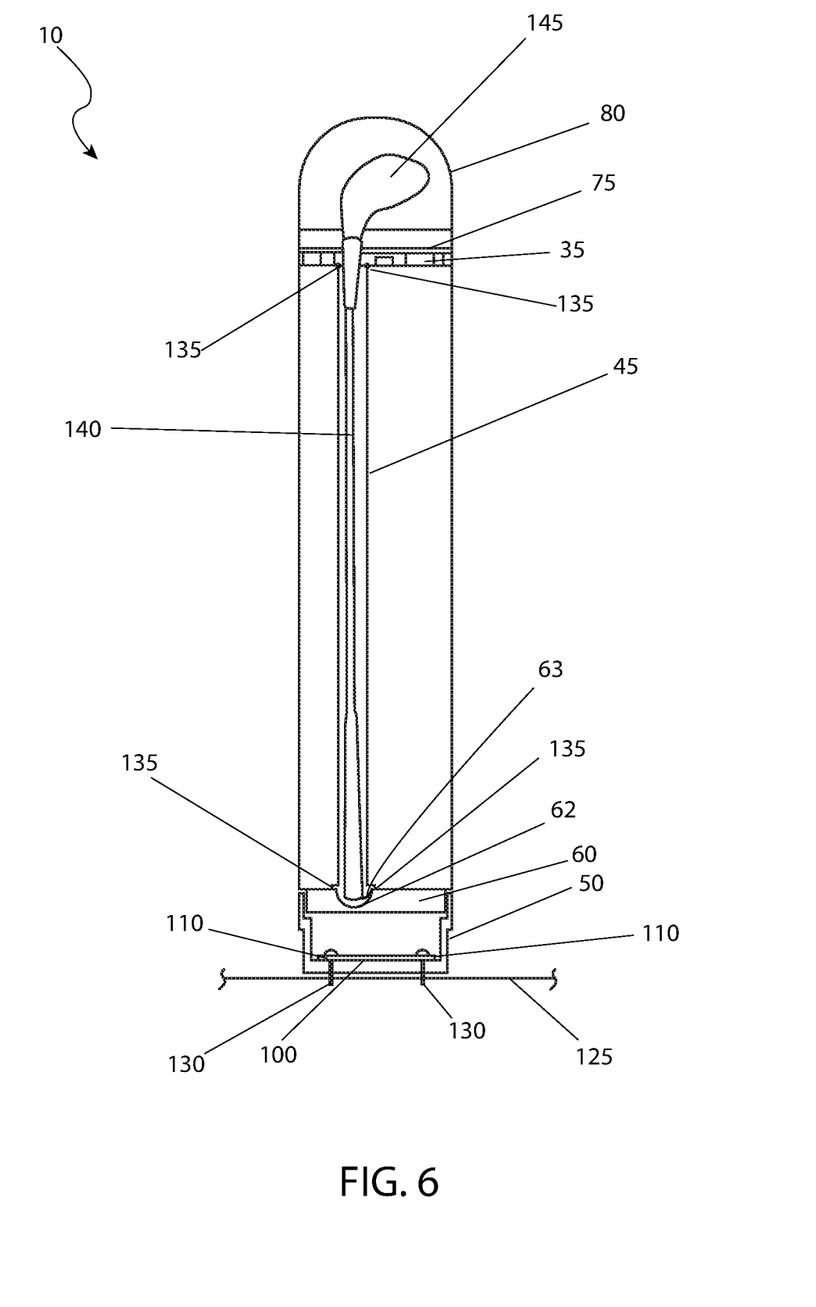

Referring to FIG. 6, a sectional view of the golf club bag 10, as seen a line I-I, as shown in FIG. 5, according to an embodiment of the present invention is disclosed. The golf club detachable base is shown affixed to the golf cart surface 125 by fasteners 130 such as bolts, screws, rivets, or the like, located through the alternate attachment base apertures 110 of the alternate attachment base 100. In its assembled state, the club divider 45 is shown restrained between the club cylinder assembly support 60 and the upper club organizer 35 (if so used). The tension spring clips 63 is shown as it prevents the golf club shaft 140 from rotating. It is noted that only one (1) club divider 45 is shown for purposes of clarity. The club divider 45 is restrained by a hook-and-loop fastener 135 at its upper ends and lower ends to the receiving cup 62 thus forming a locked assembly. A golf club shaft 140 is then contained within the club divider 45, while the golf club head 145 protrudes through the liner 75 and is protected within the golf club bag lid 80 as shown.

The exact specifications, materials used, and method of use of golf club bag 10 may vary upon manufacturing.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A golf bag, comprising:
a central bag assembly defining a central bag assembly interior, said central bag assembly interior accessed by a central bag assembly upper opening, at a second end of said central bag assembly is a golf club detachable base defining a bottom and an interior into which a club cylinder assembly support having a protruding club cylinder assembly support axle is removably nested, said club cylinder assembly is removably and rotationally secured within said central bag assembly interior, and said club cylinder assembly is made of a plurality of club dividers;
a cylinder axle running vertically through a center of said club dividers, said cylinder axle permits said club dividers to freely rotate in a first direction or an opposite second direction about said cylinder axle, said club cylinder assembly is capped by an upper club organizer at a first end and said club cylinder assembly support at said second end;
a plurality of pockets disposed on said exterior of said bag assembly, each said pockets having a spring pocket hinge and a pocket handle, an interior of said club cylinder assembly support includes a plurality of receiving cups into which said base of a given golf club is secured;
a support sleeve disposed vertically along a first exterior side of said central bag assembly;
a strap channel disposed above a first pocket, said strap channel provides a space through which a strap is secured within, said strap is employed to secure said golf bag to a golf cart;
a golf club bag lid disposed on said central bag assembly upper opening; and
an alternate golf cart attachment member with a cruciform shape having at least one fastener aperture disposed at a distal end of each arm of said alternate golf cart attachment member;
wherein said alternate golf cart attachment member permits securing a bottom of said golf bag to a planar surface associated with said golf cart by a fastener secured through each fastener aperture and around a surface of said golf cart; and
wherein said alternate golf cart attachment member permits securing a tray of said golf bag to said planar surface associated with said golf cart by said fastener secured through each fastener aperture and around a surface of said golf cart.

2. The golf bag according to claim 1, wherein said golf club detachable base is affixed to a golf cart surface by a plurality of fasteners selected from the group consisting of a plurality of bolts, a plurality of screws, or a plurality of rivets.

3. The golf bag according to claim 1, wherein said upper club organizer and said club cylinder assembly support is capped by a rubberized liner.

4. The golf bag according to claim 3, wherein a golf club shaft is contained within said club divider, while a golf club head protrudes through said rubberized liner and is protected within said golf club bag lid.

5. The golf bag according to claim 1, wherein said club dividers are made of nylon.

6. The golf bag according to claim 1, wherein said club cylinder assembly support rotates with said cylinder assembly.

7. The golf bag according to claim 1, wherein said golf club bag lid is made of a durable water-proof material.

8. The golf bag according to claim 1, wherein said golf bag is made of a durable water-proof material.

* * * * *